United States Patent [19]

Böck

[11] 4,262,977
[45] Apr. 21, 1981

[54] FLEXURAL VIBRATION DAMPER

[75] Inventor: Kurt Böck, Olching, Fed. Rep. of Germany

[73] Assignee: Bayerische Motoren Werke A.G., Munich, Fed. Rep. of Germany

[21] Appl. No.: 946,220

[22] Filed: Sep. 27, 1978

[30] Foreign Application Priority Data

Sep. 30, 1977 [DE] Fed. Rep. of Germany ....... 2744040

[51] Int. Cl.³ ............................................. F16C 27/00
[52] U.S. Cl. ........................................ 308/26; 308/28; 308/DIG. 4
[58] Field of Search ............... 308/28, 26, 27, DIG. 4, 308/29, 202; 64/1 V

[56] References Cited

U.S. PATENT DOCUMENTS

| 1,210,085 | 12/1916 | Le Blanc | 308/28 |
| 2,673,746 | 3/1954 | Thompson | 308/DIG. 4 |
| 2,859,071 | 11/1958 | Riehl et al. | 308/28 |
| 2,873,151 | 2/1959 | Leister | 308/28 |
| 3,306,680 | 2/1967 | Bruyere | 308/27 |

FOREIGN PATENT DOCUMENTS 2025855 12/1971 Fed. Rep. of Germany ............ 64/1 V Primary Examiner—Lenard A. Footland
Attorney, Agent, or Firm—Craig and Antonelli

[57] ABSTRACT

A damper for the elimination or reduction of flexural vibrations in rotating shafts, consisting essentially of a damper mass surrounding the shaft with a radial spacing and of a support member, whereby both parts are connected by way of at least one spring element; the support member is thereby rotatably supported on the shaft and the flexural vibration damper is operatively connected with a fixed part.

6 Claims, 2 Drawing Figures

FIG. 3.
FIG. 4.
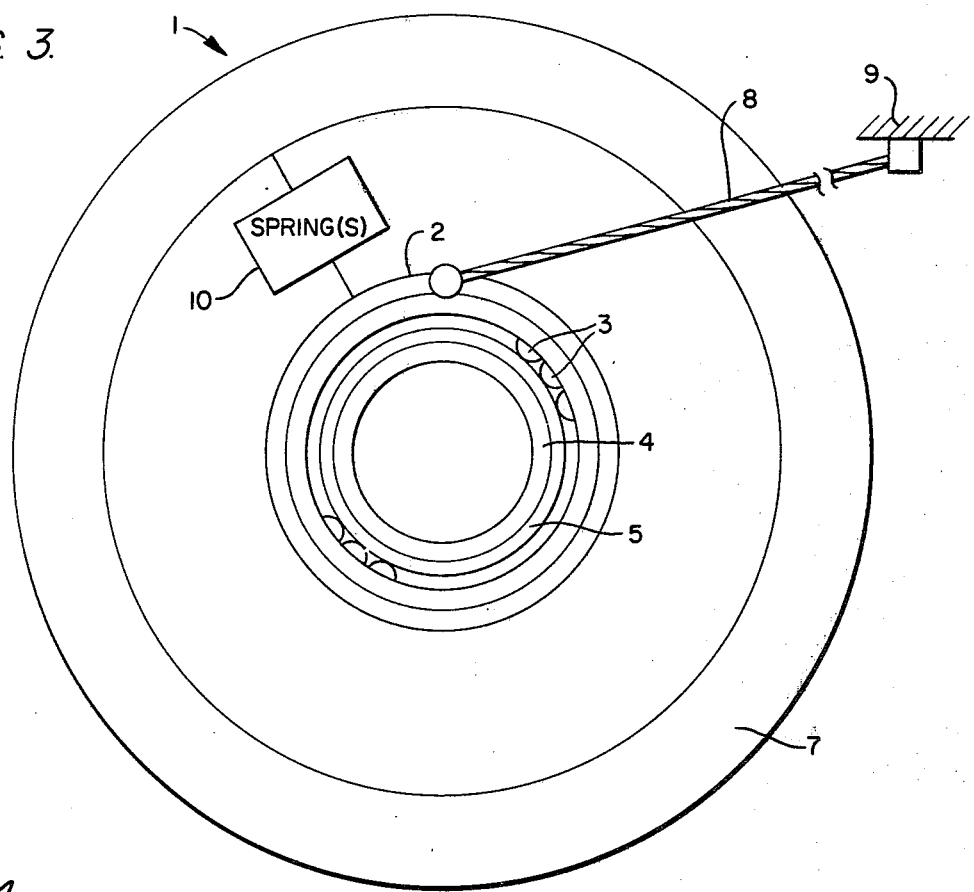
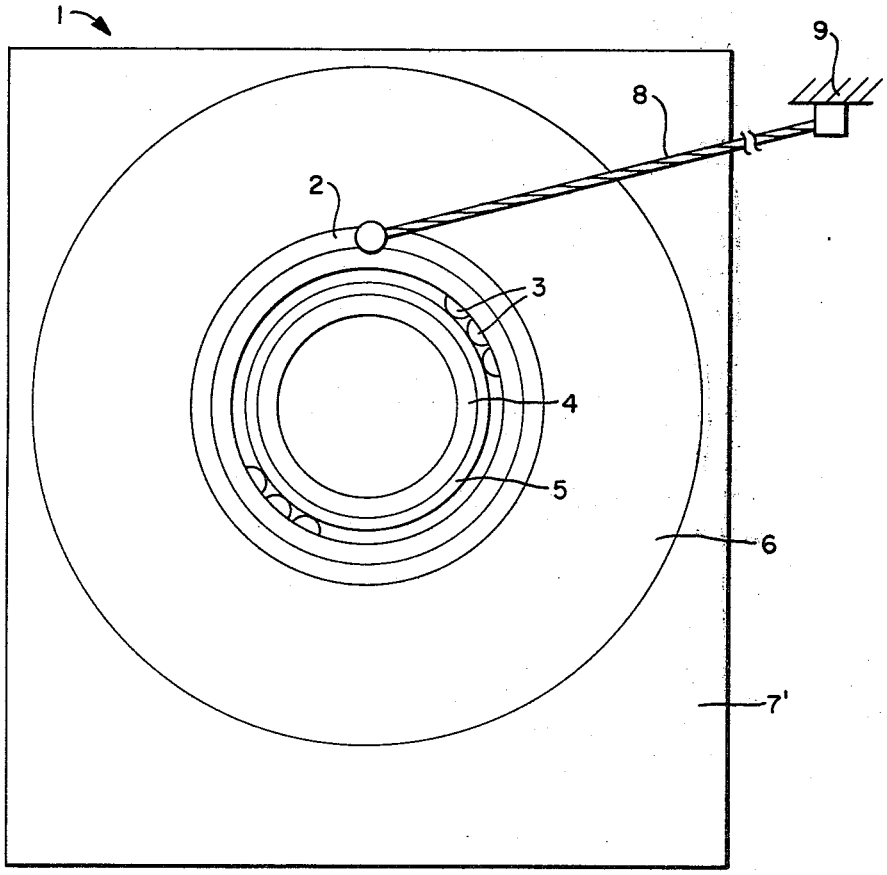

FLEXURAL VIBRATION DAMPER

The present invention relates to a damper for the elimination or the reduction of flexural vibrations of rotating shafts, essentially consisting of a damper mass surrounding the shaft at a radial distance and of a support member, whereby both parts are connected by way of at least one spring element.

For example, during the operation of a passenger motor vehicle, both rotational vibrations as also flexural vibrations may occur at the universal joint shaft. The dampers known in the prior art for damping the flexural vibrations (German Offenlegungsschrift No. 25 08 212) rotate in unison with the universal joint shaft and essentially consist of a support member rigidly connected with the shaft, on which is secured an intermediate layer rubber-elastic in the radial direction which, in its turn, carries the damper mass. The flexural vibration damper must be balanced in case of existing static and dynamic imbalances which especially with the large series-manufacturing existing in the motor vehicle industry, is costly from a labor point of view. Slight residual imbalances are also unavoidable sometimes which may be very disturbing in the critical rotational speed range. Furthermore, the rotating dampers increase the mass inertia moment of the shaft in an undesired manner.

It is therefore an aim of the present invention to so construct and arrange a flexural vibration damper of the aforementioned type that it does not have to be balanced and the inertia moment of the shaft is not influenced.

The underlying problems are solved according to the present invention in that the support member is rotatably supported on the shaft and the flexural vibration damper is operatively connected with a fixed part.

In addition to the avoidance of the disadvantages of the state of the art, a simple damper balancing exists in an advantageous manner with a flexural vibration damper according to the present invention because a non-rotating flexural vibration damper can be matched and balanced more simply to the critical rotational speed than a flexural vibration damper which, in its turn, rotates in unison with the shaft. Since the flexural vibration damper according to the present invention does not rotate in unison with the shaft, the inertia moments thereof remain nearly unchanged. Consequently, also several flexural vibration dampers may be arranged on one shaft. Since the inertia moment of the shaft is influenced only insignificantly by the flexural vibration damper, it can also be used advantageously for rapidly rotating shafts.

Provision is made in one embodiment of the present invention that the support member is rotatably supported on the shaft, respectively, on the sleeve by way of a slide or roller bearing.

Another construction of the present invention resides in that the support member or the damper mass of the flexural vibration damper is operatively connected with the fixed part by way of a flexible connecting element such as a wire cable or the like.

Accordingly, it is an object of the present invention to provide a flexural vibration damper which avoids by simple means the aforementioned shortcomings and drawbacks encountered in the prior art.

Another object of the present invention resides in a flexural vibration damper which leaves the inertia moments of the shaft essentially unaffected.

Still a further object of the present invention resides in a flexural vibration damper which does not have to be balanced.

Another object of the present invention resides in a flexural vibration damper of the type described above which can be utilized for rapidly rotating shafts.

A further object of the present invention resides in a flexural vibration damper of such construction that several flexural vibration dampers may be arranged on one and the same shaft.

These and other objects, features and advantages of the present invention will become more apparent from the following description when taken in connection with the accompanying drawing which shows, for purposes of illustration only, one embodiment in accordance with the present invention, and wherein.

FIG. 3 is a front elevational view of another flexural vibration damper in accordance with the present invention wherein a metal spring or springs are arranged between the support member and damper mass, the metal spring or springs being shown only in schematic form; and FIG. 4 is a front elevational view of a fourth flexural vibration damper in accordance with the present invention wherein the damper mass, shown only schematically, has a non-rotationally symmetric external shape and its center of gravity disposed eccentrically with respect to the shaft and vertically underneath the same.

Figure 1:
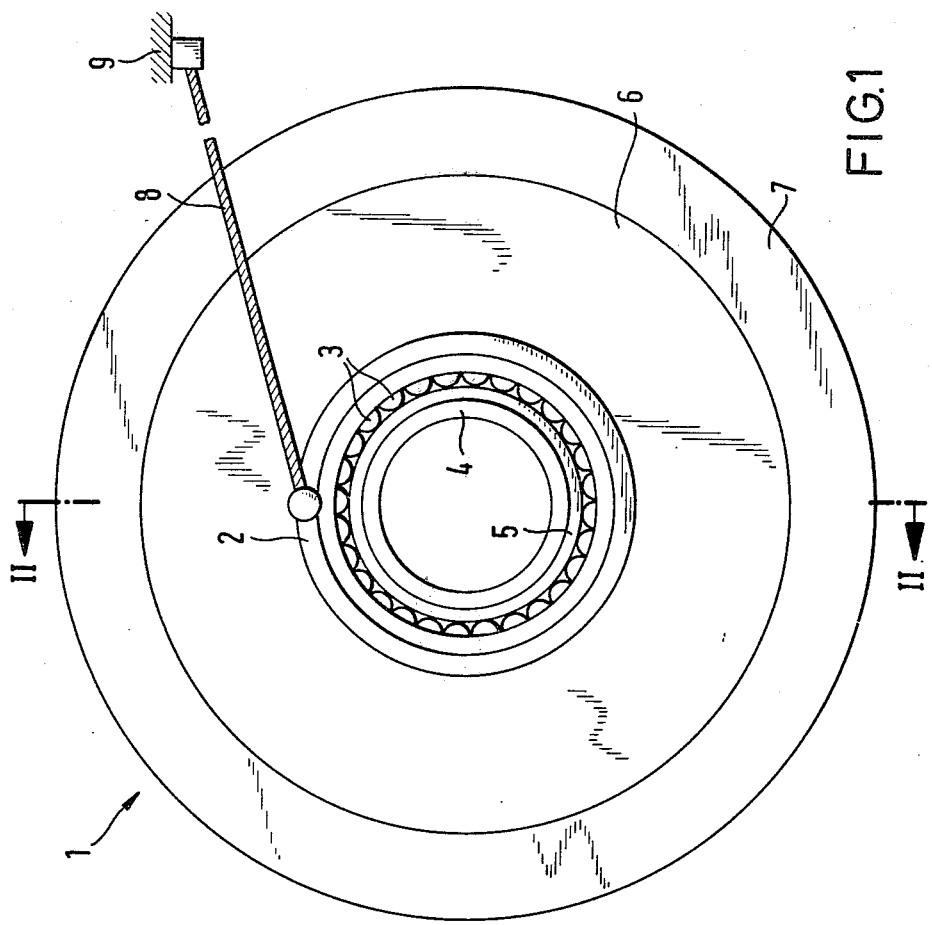
FIG. 1 is a front elevational view of a flexural vibration damper in accordance with the present invention.
Figure 2:
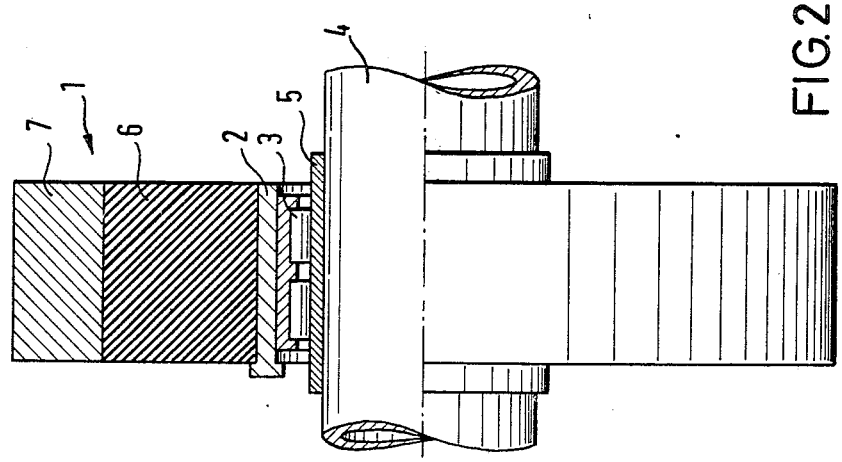
FIG. 2 is a cross-sectional view taken along line II—II in FIG. 1.

Referring now to the drawing wherein like reference numerals are used throughout the two views to designate like parts, the flexural vibration damper generally designated by reference numeral 1 which is illustrated in FIGS. 1 and 2, essentially consists of a sleeve-shaped support member 2 which is rotatably supported by way of a roller bearing 3 on a sleeve or bush 5 connected with a shaft 4. Similarly, the support member 2 may also be slidingly supported on the sleeve 5 or may also be supported directly on the shaft 4. The support member 2 is adhesively connected with a spring element 6 of rubber-elastic material whereas the spring element 6, in its turn, adhesively carries the damper mass 7.

The flexural vibration damper 1 is secured against rotation by a connecting element 8 which, in its turn, is secured, on the one hand, at the support member 2, and on the other, at a relatively fixed part 9. For example, in case of flexural vibrations present in a universal joint shaft of a motor vehicle, the flexural vibration damper 1 may be arranged advantageously at the oscillation antinode whereby a connecting element 8 which is flexible (wire cable or the like) does not act as sound-transmitting bridge to the vehicle body. If needed, also several flexural vibration dampers 1 may be arranged on a shaft 4. With a rotating shaft 4, flexural vibrations present on the shaft 4 are eliminated or reduced by the flexural vibration damper 1 according to the present invention as a result of its resonance behavior. The damper mass 7 need not be constructed axially symmetrically; its most appropriate external shape from a vibration point of view is to be determined empirically. It is also feasible to arrange the center of gravity of the damper mass 7 eccentrically to the shaft 4 and vertically underneath the same as the damper mass 7' represented in box form in FIG. 4. As a result thereof, a separate element at the flexural vibration damper 1 to prevent rotation may be dispensed with under certain circumstances.

In lieu of a spring element 6 consisting of rubber-elastic material, also metal springs may be provided which are secured, on the one hand, at the support member 2 and, on the other, at the damper mass 7 as represented by the box 10 in FIG. 3.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A damper for eliminating or reducing flexural vibrations in a rotating shaft, comprising a damper mass means surrounding the shaft at a radial distance and a support means, said support means being rotatably mounted on the shaft end supporting said damper mass means by way of at least one spring means, and said damper being operatively connected with a relatively fixed part, characterized in that one of the parts consisting of the support means and the damper mass means is operatively connected with the relatively fixed part by way of an elongate flexible connecting element strung therebetween, and wherein said flexible connecting element is a wire cable.

2. A flexural vibration damper according to claim 1, characterized in that said damper mass means has a non-rotationally symmetric external shape and has its center of gravity disposed eccentrically with respect to said shaft and vertically underneath the same.

3. A flexural vibration damper according to claim 1, characterized in that the damper mass means surrounds the support means at a radial distance.

4. A flexural vibration damper according to claim 3, characterized in that said spring means operatively connects the damper mass means and the support means and is made of a rubber-elastic material which is interposed between said damper mass means and said support means.

5. A damper for eliminating or reducing flexural vibrations in a rotating shaft, comprising a damper mass means surrounding the shaft at a radial distance and a support means, said support means being rotatably mounted on the shaft end supporting said damper mass means by way of at least one spring means, and said damper being operatively connected with a relatively fixed part, characterized in that one of the parts consisting of the support means and the damper mass means is operatively connected with the relatively fixed part by way of an elongate flexible connecting element strung therebetween, in that the damper mass means surrounds the support means at a radial distance, and in that said spring means comprises at least one metal spring.

6. A flexural vibration damper according to claim 5, characterized in that said spring means comprises several metal springs.

* * * * *